US012190730B2

(12) United States Patent
Bao et al.

(10) Patent No.: US 12,190,730 B2
(45) Date of Patent: Jan. 7, 2025

(54) PARKING SPACE MANAGEMENT SYSTEM

(71) Applicant: E Ink Corporation, Billerica, MA (US)

(72) Inventors: Zhen Bao, Lexington, MA (US); George G. Harris, Woburn, MA (US); Brian D. Bean, Newton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/113,669

(22) Filed: Feb. 24, 2023

(65) Prior Publication Data

US 2023/0274643 A1 Aug. 31, 2023

Related U.S. Application Data

(60) Provisional application No. 63/315,067, filed on Feb. 28, 2022.

(51) Int. Cl.
*G08G 1/14* (2006.01)
*G09G 3/34* (2006.01)

(52) U.S. Cl.
CPC ............. *G08G 1/142* (2013.01); *G08G 1/146* (2013.01); *G09G 3/344* (2013.01)

(58) Field of Classification Search
CPC ......... G08G 1/142; G08G 1/146; G08G 1/344
See application file for complete search history.

(56) References Cited

U.S. PATENT DOCUMENTS 4,418,346 A 11/1983 Batchelder
5,760,761 A 6/1998 Sheridon
5,777,782 A 7/1998 Sheridon
5,808,783 A 9/1998 Crowley
5,872,552 A 2/1999 Gordon, II et al.
5,930,026 A 7/1999 Jacobson et al.
6,017,584 A 1/2000 Albert et al.
6,054,071 A 4/2000 Mikkelsen, Jr.
(Continued)

FOREIGN PATENT DOCUMENTS

CN 103280121 A 9/2013
CN 103514641 A 1/2014
(Continued)

OTHER PUBLICATIONS

Korean Intellectual Property Office, "International Search Report and Written Opinion", PCT/US2023/013774, Jun. 19, 2023.
(Continued)

*Primary Examiner* — Hoi C Lau
(74) *Attorney, Agent, or Firm* — Brian D. Bean

(57) ABSTRACT

A parking space management system includes a bistable reflective display, such as an electrophoretic display, which is sunlight-readable and only requires power when the information on the display is updated. One or more detectors are configured to determine the presence of an object within a bounded space, such as a parking space, and communicate that status to the bistable reflective display, thereby causing the bistable reflective display to show the presence of an object within the bounded space to an observer. Such a system is easy to implement and will save drivers' time because they don't have to hunt for a parking spot. Such a system also reduces tailpipe emissions because it is not necessary to drive up and down multiple aisles of cars looking for an open parking spot.

7 Claims, 10 Drawing Sheets

(56) References Cited

U.S. PATENT DOCUMENTS

| | | | |
|---|---|---|---|
| 6,055,091 | A | 4/2000 | Sheridon |
| 6,097,531 | A | 8/2000 | Sheridon |
| 6,124,851 | A | 9/2000 | Jacobson |
| 6,128,124 | A | 10/2000 | Silverman |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,252,564 | B1 | 6/2001 | Albert et al. |
| 6,271,823 | B1 | 8/2001 | Gordon, II et al. |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,376,828 | B1 | 4/2002 | Comiskey |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,489 | B1 | 9/2002 | Jacobson et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,518,949 | B2 | 2/2003 | Drzaic |
| 6,531,997 | B1 | 3/2003 | Gates et al. |
| 6,545,291 | B1 | 4/2003 | Amundson et al. |
| 6,639,578 | B1 | 10/2003 | Comiskey et al. |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,683,333 | B2 | 1/2004 | Kazlas et al. |
| 6,704,133 | B2 | 3/2004 | Gates et al. |
| 6,724,519 | B1 | 4/2004 | Comiskey et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,825,068 | B2 | 11/2004 | Denis et al. |
| 6,825,970 | B2 | 11/2004 | Goenaga et al. |
| 6,831,769 | B2 | 12/2004 | Holman et al. |
| 6,842,279 | B2 | 1/2005 | Amundson |
| 6,842,657 | B1 | 1/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,873,452 | B2 | 3/2005 | Tseng et al. |
| 6,900,851 | B2 | 5/2005 | Morrison et al. |
| 6,909,532 | B2 | 6/2005 | Chung et al. |
| 6,922,276 | B2 | 7/2005 | Zhang et al. |
| 6,950,220 | B2 | 9/2005 | Abramson et al. |
| 6,967,640 | B2 | 11/2005 | Albert et al. |
| 6,980,196 | B1 | 12/2005 | Turner et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,012,735 | B2 | 3/2006 | Honeyman |
| 7,023,420 | B2 | 4/2006 | Comiskey et al. |
| 7,026,954 | B2 | 4/2006 | Slemmer et al. |
| 7,030,412 | B1 | 4/2006 | Drzaic et al. |
| 7,034,783 | B2 | 4/2006 | Gates et al. |
| 7,061,166 | B2 | 6/2006 | Kuniyasu |
| 7,061,662 | B2 | 6/2006 | Chung et al. |
| 7,075,502 | B1 | 7/2006 | Drzaic et al. |
| 7,075,703 | B2 | 7/2006 | O'Neil et al. |
| 7,106,296 | B1 | 9/2006 | Jacobson |
| 7,110,163 | B2 | 9/2006 | Webber et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,148,128 | B2 | 12/2006 | Jacobson |
| 7,167,155 | B1 | 1/2007 | Albert et al. |
| 7,170,670 | B2 | 1/2007 | Webber |
| 7,173,752 | B2 | 2/2007 | Doshi et al. |
| 7,176,880 | B2 | 2/2007 | Amundson et al. |
| 7,177,066 | B2 | 2/2007 | Chung et al. |
| 7,190,008 | B2 | 3/2007 | Amundson et al. |
| 7,193,625 | B2 | 3/2007 | Danner et al. |
| 7,202,847 | B2 | 4/2007 | Gates |
| 7,206,119 | B2 | 4/2007 | Honeyman et al. |
| 7,223,672 | B2 | 5/2007 | Kazlas et al. |
| 7,230,751 | B2 | 6/2007 | Whitesides et al. |
| 7,236,291 | B2 | 6/2007 | Kaga et al. |
| 7,256,766 | B2 | 8/2007 | Albert et al. |
| 7,259,744 | B2 | 8/2007 | Arango et al. |
| 7,274,306 | B2 | 9/2007 | Publicover |
| 7,301,693 | B2 | 11/2007 | Chaug et al. |
| 7,304,780 | B2 | 12/2007 | Liu et al. |
| 7,312,784 | B2 | 12/2007 | Baucom et al. |
| 7,321,459 | B2 | 1/2008 | Masuda et al. |
| 7,327,346 | B2 | 2/2008 | Chung et al. |
| 7,327,511 | B2 | 2/2008 | Whitesides et al. |
| 7,339,715 | B2 | 3/2008 | Webber et al. |
| 7,347,957 | B2 | 3/2008 | Wu et al. |
| 7,352,353 | B2 | 4/2008 | Albert et al. |
| 7,365,733 | B2 | 4/2008 | Duthaler et al. |
| 7,388,572 | B2 | 6/2008 | Duthaler et al. |
| 7,401,758 | B2 | 7/2008 | Liang et al. |
| 7,408,699 | B2 | 8/2008 | Wang et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,492,497 | B2 | 2/2009 | Paolini, Jr. et al. |
| 7,528,822 | B2 | 5/2009 | Amundson et al. |
| 7,535,624 | B2 | 5/2009 | Amundson et al. |
| 7,551,346 | B2 | 6/2009 | Fazel et al. |
| 7,554,712 | B2 | 6/2009 | Patry et al. |
| 7,560,004 | B2 | 7/2009 | Pereira et al. |
| 7,583,251 | B2 | 9/2009 | Arango et al. |
| 7,583,427 | B2 | 9/2009 | Danner et al. |
| 7,598,173 | B2 | 10/2009 | Ritenour et al. |
| 7,602,374 | B2 | 10/2009 | Zehner et al. |
| 7,612,760 | B2 | 11/2009 | Kawai |
| 7,636,191 | B2 | 12/2009 | Duthaler et al. |
| 7,649,674 | B2 | 1/2010 | Danner et al. |
| 7,667,886 | B2 | 2/2010 | Danner et al. |
| 7,672,040 | B2 | 3/2010 | Sohn et al. |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,688,497 | B2 | 3/2010 | Danner et al. |
| 7,830,592 | B1 | 11/2010 | Sprague et al. |
| 7,839,564 | B2 | 11/2010 | Whitesides et al. |
| 7,859,742 | B1 | 12/2010 | Chiu et al. |
| 7,880,958 | B2 | 2/2011 | Zang et al. |
| 7,893,435 | B2 | 2/2011 | Kazlas et al. |
| 7,905,977 | B2 | 3/2011 | Qi et al. |
| 7,910,175 | B2 | 3/2011 | Webber |
| 7,952,557 | B2 | 5/2011 | Amundson |
| 7,952,790 | B2 | 5/2011 | Honeyman et al. |
| 7,982,479 | B2 | 7/2011 | Wang et al. |
| 7,986,450 | B2 | 7/2011 | Cao et al. |
| 7,999,787 | B2 | 8/2011 | Amundson et al. |
| 8,009,348 | B2 | 8/2011 | Zehner et al. |
| 8,040,594 | B2 | 10/2011 | Paolini, Jr. et al. |
| 8,049,947 | B2 | 11/2011 | Danner et al. |
| 8,054,526 | B2 | 11/2011 | Bouchard |
| 8,072,675 | B2 | 12/2011 | Lin et al. |
| 8,098,418 | B2 | 1/2012 | Paolini, Jr. et al. |
| 8,120,836 | B2 | 2/2012 | Lin et al. |
| 8,125,501 | B2 | 2/2012 | Amundson et al. |
| 8,139,050 | B2 | 3/2012 | Jacobson et al. |
| 8,159,636 | B2 | 4/2012 | Sun et al. |
| 8,174,490 | B2 | 5/2012 | Whitesides et al. |
| 8,237,892 | B1 | 8/2012 | Sprague et al. |
| 8,243,013 | B1 | 8/2012 | Sprague et al. |
| 8,274,472 | B1 | 9/2012 | Wang et al. |

(56) References Cited

U.S. PATENT DOCUMENTS 8,289,250 B2 10/2012 Zehner et al.
8,300,006 B2 10/2012 Zhou et al.
8,314,784 B2 11/2012 Ohkami et al.
8,319,759 B2 11/2012 Jacobson et al.
8,362,488 B2 1/2013 Chaug et al.
8,363,299 B2 1/2013 Paolini, Jr. et al.
8,373,649 B2 2/2013 Low et al.
8,384,658 B2 2/2013 Albert et al.
8,395,836 B2 3/2013 Lin
8,437,069 B2 5/2013 Lin
8,441,414 B2 5/2013 Lin
8,456,414 B2 6/2013 Lin et al.
8,456,589 B1 6/2013 Sprague et al.
8,462,102 B2 6/2013 Wong et al.
8,514,168 B2 8/2013 Chung et al.
8,537,105 B2 9/2013 Chiu et al.
8,547,628 B2 10/2013 Wu et al.
8,558,783 B2 10/2013 Wilcox et al.
8,558,786 B2 10/2013 Lin
8,558,855 B2 10/2013 Sprague et al.
8,576,162 B2 11/2013 Kang
8,576,164 B2 11/2013 Sprague et al.
8,576,259 B2 11/2013 Lin et al.
8,576,470 B2 11/2013 Paolini, Jr. et al.
8,576,476 B2 11/2013 Telfer et al.
8,605,032 B2 12/2013 Liu et al.
8,610,988 B2 12/2013 Zehner et al.
8,643,595 B2 2/2014 Chung et al.
8,665,206 B2 3/2014 Lin et al.
8,681,191 B2 3/2014 Yang et al.
8,714,780 B2 5/2014 Ho et al.
8,728,266 B2 5/2014 Danner et al.
8,743,077 B1 6/2014 Sprague
8,754,859 B2 6/2014 Gates et al.
8,797,258 B2 8/2014 Sprague
8,797,633 B1 8/2014 Sprague et al.
8,797,634 B2 8/2014 Paolini, Jr. et al.
8,797,636 B2 8/2014 Yang et al.
8,810,525 B2 8/2014 Sprague
8,902,153 B2 12/2014 Bouchard et al.
8,928,562 B2 1/2015 Gates et al.
8,928,641 B2 1/2015 Chiu et al.
8,976,444 B2 3/2015 Zhang et al.
9,013,394 B2 4/2015 Lin
9,019,197 B2 4/2015 Lin
9,019,198 B2 4/2015 Lin et al.
9,019,318 B2 4/2015 Sprague et al.
9,025,234 B2 5/2015 Lin
9,025,238 B2 5/2015 Chan et al.
9,030,374 B2 5/2015 Sprague et al.
9,081,248 B2 7/2015 Noh et al.
9,082,352 B2 7/2015 Cheng et al.
9,140,952 B2 9/2015 Sprague et al.
9,147,364 B2 9/2015 Wu et al.
9,171,508 B2 10/2015 Sprague et al.
9,199,441 B2 12/2015 Danner
9,201,279 B2 12/2015 Wu et al.
9,218,773 B2 12/2015 Sun et al.
9,223,164 B2 12/2015 Lai et al.
9,224,338 B2 12/2015 Chan et al.
9,224,342 B2 12/2015 Sprague et al.
9,224,344 B2 12/2015 Chung et al.
9,230,492 B2 1/2016 Harrington et al.
9,251,736 B2 2/2016 Lin et al.
9,262,973 B2 2/2016 Wu et al.
9,285,648 B2 3/2016 Liu et al.
9,299,294 B2 3/2016 Lin et al.
9,310,661 B2 4/2016 Wu et al.
9,373,289 B2 6/2016 Sprague et al.
9,390,066 B2 7/2016 Smith et al.
9,390,661 B2 7/2016 Chiu et al.
9,454,057 B2 9/2016 Wu et al.
9,460,666 B2 10/2016 Sprague et al.
9,495,918 B2 11/2016 Harrington et al.
9,501,981 B2 11/2016 Lin et al.
9,513,743 B2 12/2016 Sjodin et al.
9,514,667 B2 12/2016 Lin
9,529,240 B2 12/2016 Paolini, Jr. et al.
9,564,088 B2 2/2017 Wilcox et al.
9,582,041 B2 2/2017 Cheng et al.
9,620,048 B2 4/2017 Sim et al.
9,620,066 B2 4/2017 Bishop
9,632,373 B2 4/2017 Huang et al.
9,666,142 B2 5/2017 Hung
9,671,635 B2 6/2017 Paolini, Jr.
9,672,766 B2 6/2017 Sjodin
9,679,310 B1 * 6/2017 Saltzstein .......... G06Q 30/0267
9,691,333 B2 6/2017 Cheng et al.
9,721,495 B2 8/2017 Harrington et al.
9,792,861 B2 10/2017 Chang et al.
9,792,862 B2 10/2017 Hung et al.
10,037,735 B2 7/2018 Amundson
10,190,743 B2 1/2019 Hertel et al.
10,229,641 B2 3/2019 Yang et al.
10,319,313 B2 6/2019 Harris et al.
10,339,876 B2 7/2019 Lin et al.
10,372,008 B2 8/2019 Telfer et al.
10,446,585 B2 10/2019 Harris et al.
10,466,564 B2 11/2019 Kayal et al.
10,613,407 B2 4/2020 Lin et al.
10,672,350 B2 6/2020 Amundson et al.
11,004,337 B2 5/2021 Subramanya
12,065,131 B2 * 8/2024 Roh ...................... B60W 30/06
2002/0060321 A1 5/2002 Kazlas et al.
2003/0102858 A1 6/2003 Jacobson et al.
2004/0085619 A1 5/2004 Wu et al.
2004/0105036 A1 6/2004 Danner et al.
2004/0246562 A1 12/2004 Chung et al.
2005/0122306 A1 6/2005 Wilcox et al.
2005/0122563 A1 6/2005 Honeyman et al.
2005/0253777 A1 11/2005 Zehner et al.
2006/0255322 A1 11/2006 Wu et al.
2007/0103427 A1 5/2007 Zhou et al.
2007/0164980 A1 * 7/2007 Manning ................. G06F 3/147
345/104
2007/0176912 A1 8/2007 Beames et al.
2007/0188483 A1 * 8/2007 Bonner ................. G09F 27/007
345/204
2008/0024429 A1 1/2008 Zehner
2008/0024482 A1 1/2008 Gates et al.
2008/0043318 A1 2/2008 Whitesides et al.
2008/0074368 A1 * 3/2008 Edwards ................. G09F 9/375
345/87
2008/0136774 A1 6/2008 Harris et al.
2008/0303780 A1 12/2008 Sprague et al.
2009/0122389 A1 5/2009 Whitesides et al.
2009/0225398 A1 9/2009 Duthaler et al.
2009/0322721 A1 12/2009 Zehner et al.
2010/0156780 A1 6/2010 Jacobson et al.
2010/0177396 A1 7/2010 Lin
2010/0194733 A1 8/2010 Lin et al.
2010/0194789 A1 8/2010 Lin et al.
2010/0265561 A1 10/2010 Gates et al.
2011/0063314 A1 3/2011 Chiu et al.
2011/0175875 A1 7/2011 Lin et al.
2011/0221740 A1 9/2011 Yang et al.
2011/0292319 A1 12/2011 Cole
2012/0001957 A1 1/2012 Liu et al.
2012/0036088 A1 * 2/2012 Chuang .................. G06Q 30/02
40/447
2012/0098740 A1 4/2012 Chiu et al.
2013/0063333 A1 3/2013 Arango et al.
2013/0249782 A1 9/2013 Wu et al.
2014/0009817 A1 1/2014 Wilcox et al.
2014/0078024 A1 3/2014 Paolini, Jr. et al.
2014/0192000 A1 7/2014 Hung et al.
2014/0204012 A1 7/2014 Wu et al.
2014/0210701 A1 7/2014 Wu et al.
2014/0240210 A1 8/2014 Wu et al.
2014/0253425 A1 9/2014 Zalesky et al.
2014/0293398 A1 10/2014 Wang et al.
2015/0262255 A1 9/2015 Khajehnouri et al.
2015/0338717 A1 11/2015 Paolini, Jr. et al.
2016/0077375 A1 3/2016 Lin

(56) References Cited

U.S. PATENT DOCUMENTS

| | | | | |
|---|---|---|---|---|
| 2016/0134930 | A1* | 5/2016 | Swafford | A47F 5/0068<br>725/80 |
| 2016/0180777 | A1 | 6/2016 | Lin et al. | |
| 2019/0205077 | A1* | 7/2019 | Paolini, Jr. | G09G 3/348 |
| 2019/0294946 | A1* | 9/2019 | Atkinson | G06F 3/14 |
| 2020/0294401 | A1* | 9/2020 | Kerecsen | G08G 1/205 |
| 2020/0394912 | A1* | 12/2020 | Kuzin | G06Q 10/02 |
| 2021/0398424 | A1 | 12/2021 | Lee et al. | |
| 2022/0024450 | A1* | 1/2022 | Roh | B60W 30/06 |
| 2022/0392321 | A1* | 12/2022 | Mayr | G09G 3/344 |
| 2023/0274643 | A1* | 8/2023 | Bao | G08G 1/142<br>340/932.2 |

FOREIGN PATENT DOCUMENTS

| | | | | |
|---|---|---|---|---|
| KR | 20210156394 | A | * | 10/2012 |
| KR | 101586706 | B1 | | 2/2016 |
| KR | 20120108565 | A | * | 12/2021 |
| WO | 1999067678 | A2 | | 12/1999 |
| WO | 2000005704 | A1 | | 2/2000 |
| WO | 2000038000 | A1 | | 6/2000 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Wood, D., "An Electrochromic Renaissance?" Information Display, 18(3), Mar. 24, 2002.

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

PARKING SPACE MANAGEMENT SYSTEM

RELATED APPLICATIONS

This application claims priority to U.S. Patent Application No. 63/315,067, filed Feb. 28, 2022. All patents and publications disclosed herein are incorporated by reference in their entireties.

SUBJECT OF THE INVENTION

The subject matter disclosed herein relates to means and methods for managing parking spaces. Specifically, the subject matter is related to means to manage parking spaces in a power free fashion.

BACKGROUND

Most parking lots or parking structures at airports or malls usually consist of many rows of parking spaces. These parking lots, especially the indoor ones, will require a driver to circling these spaces one row at a time, making it very time consuming to find an open space. Making the problem even worse is when a passenger is trying to catch a flight in a hurry, trying to find an open space this way becomes really inefficient and tedious.

As such, there exists a need to for a parking space management system that can provide easy access to users to available spaces.

DETAILED DESCRIPTION

Figure 1:
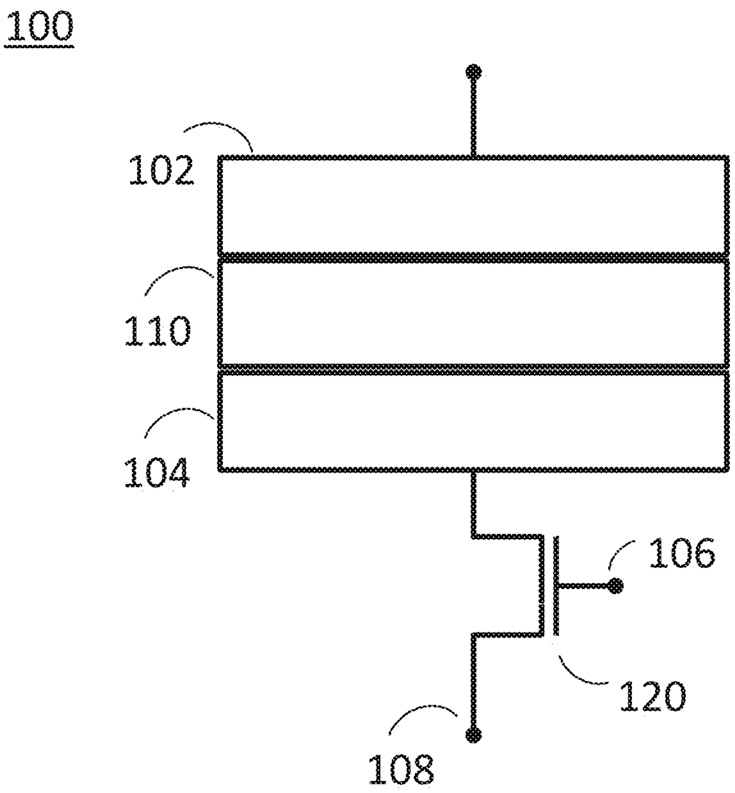
FIG. 1 illustrates a circuit diagram representing an exemplary electrophoretic display.

The subject matter disclosed herein relates to parking space management. Specifically, it is related to system for managing parking spaces. More generally, the invention comprises a number of embodiments of parking management systems including a bistable reflective display and a plurality of detectors configured to determine the presence of an object within a bounded space. The bounded space may be a parking spot and the object may be a vehicle, however the same invention can be used to, for example, keep track of inventory on a series of shelves in a warehouse or a "big box" type shopping center. In general the plurality of detectors are configured to communicate with the bistable reflective display such that the bistable reflective display shows the presence of an object within the bounded space. Because the bistable reflective display only requires power for updates, the display can continue to show the necessary information for long periods of time without drawing power. Accordingly, it is straightforward to incorporate independent power sources, such as photovoltaics and/or batteries.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays or EPDs. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", *IDW Japan,* 2001, Paper HCS1-1, and Yamaguchi, Y., et al., "Toner display using insulative particles charged triboelectrically", *IDW Japan,* 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/

0356927; 2015/0378235; 2016/077375; 2016/0103380; and 2016/0187759; and International Application Publication No. WO 00/38000; European Patents Nos. 1,099,207 B1 and 1,145,072 B1.

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 7,012,600 and 7,453,445;

(g) Applications of displays; see for example U.S. Pat. Nos. 7,312,784 and 8,009,348;

(h) Non-electrophoretic displays, as described in U.S. Pat. Nos. 6,241,921; 6,950,220; 7,420,549 and 8,319,759; and U.S. Patent Application Publication No. 2012/0293858;

(i) Microcell structures, wall materials, and methods of forming microcells; see for example U.S. Pat. Nos. 7,072,095 and 9,279,906; and (j) Methods for filling and sealing microcells; see for example U.S. Pat. Nos. 7,144,942 and 7,715,088.

This application is further related to U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1; all of the above-listed applications are incorporated by reference in their entireties.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777; all of the above-listed applications are incorporated by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

FIG. 1 shows a schematic of a pixel 100 of an electro-optic display or EPD in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 2:
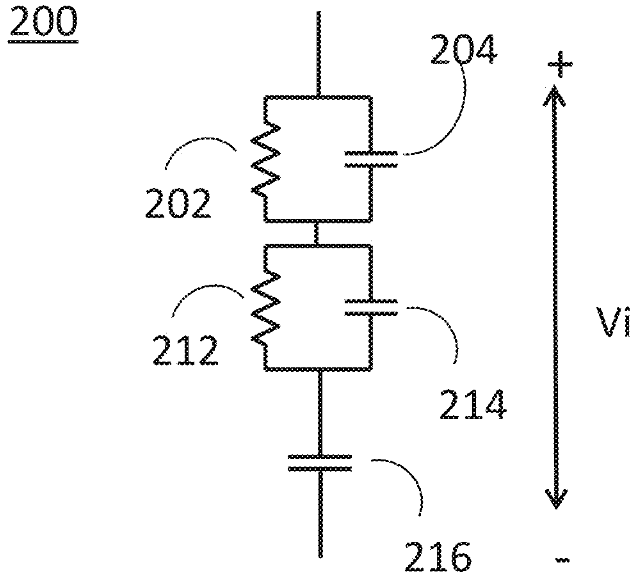
FIG. 2 shows a circuit model of the electro-optic imaging layer.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Because electrophoretic displays are bistable and reflective, they are superior for outdoor display applications, especially when the outdoor displays are to be installed at a facility that does not have readily-accessible power, such as a remote parking lot. The displays rely on ambient lighting and only require power to change the display. The bistable displays do not consume any power when displaying information otherwise. The bistability can last for months without being updated. Accordingly, electrophoretic displays can be coupled to photovoltaics and batteries when regular electrical utilities are not available. This allows for faster deployment, less cost and permitting during installation, and overall lower power consumption for the facility. Additionally, by using lower power components and communication equipment, it is possible to also power the sensors and the various communications components using only photovoltaics and/or batteries. (A photovoltaic cell (a.k.a. photovoltaic) comprises one or more photovoltaic elements, which comprise a semiconductor material. A typical photovoltaic generates light when incident light contacts the photovoltaic element of the photovoltaic layer, initiating the generation of an electric current or a voltage. The resulting voltage can be used directly to power, for example, an electrophoretic display, or more commonly the photovoltaic-generated power is stored in a batter or supercapacitor until needed to power an electrophoretic display or other electronic device. Pohotovoltaics typically include polysilicon photocells, amorphous silicon photocells, organic photovoltaic cells, or specialty materials, such as cadmium telluride or copper indium gallium diselenide. The cells may be printed or fabricated with lithographic techniques. Suitable photovoltaic cells can be purchased from, for example, E-ton Solar Tech, Ltd., Tainan City, Taiwan.

Figure 3:
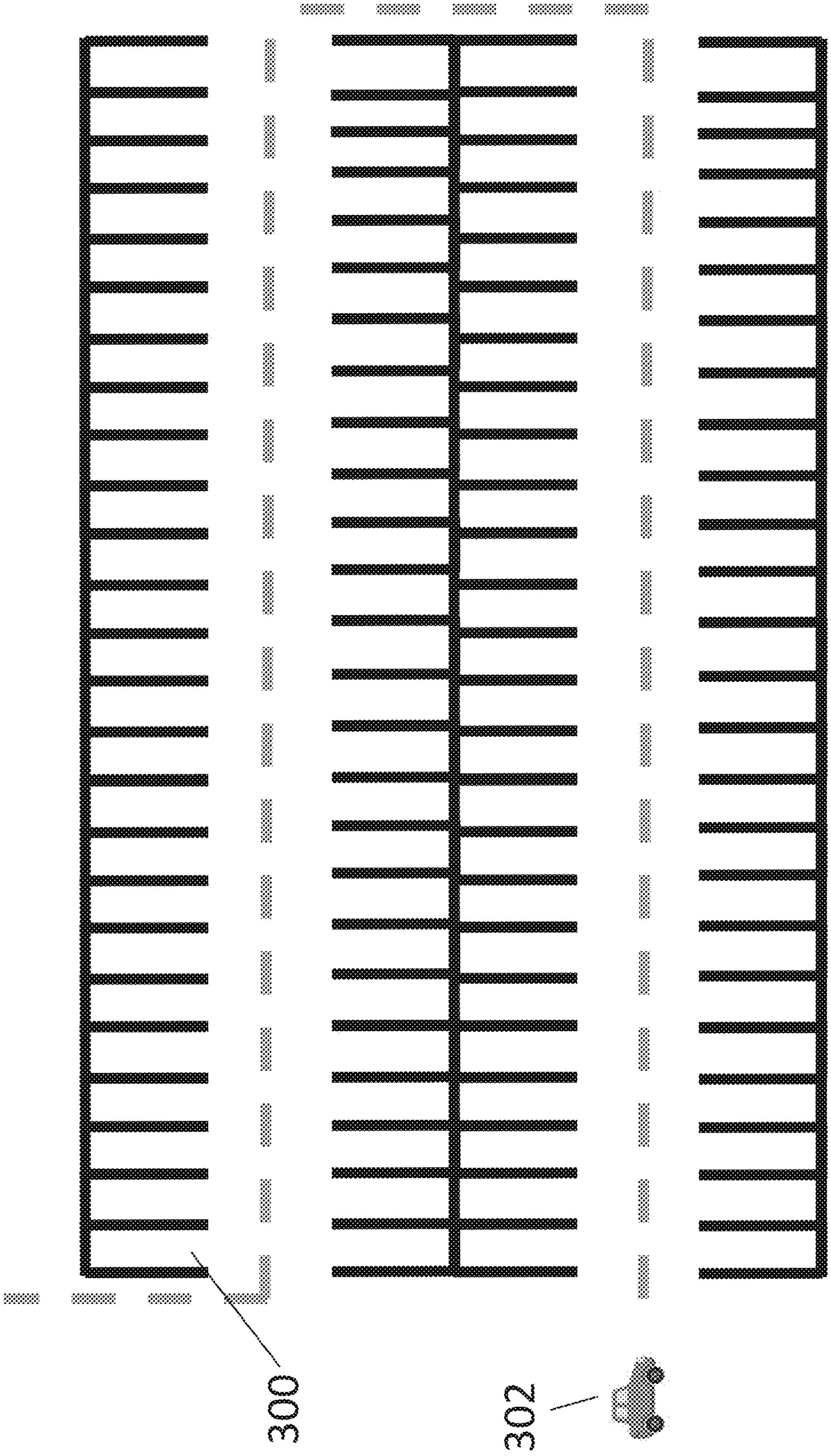
FIG. 3 (PRIOR ART)
FIG. 3 illustrates an exemplary parking structure in accordance with the subject matter disclosed herein.

In some embodiments, electro-optic displays or EPDs described herein may be used for a parking space management system. Referring now to FIG. 3, illustrated is an exemplary parking structure with rows of parking spaces 300. An automobile 302 looking for an open parking space usually needs to circle the spaces one row at a time, sometimes continuously circle the rows until a space becomes available. This method is time consuming, and wastes fuel for the automobile 302. This parking-spot hunting method is particularly frustrating in open parking lots, such as outside of malls or big-box stores, where it is not easy to rapidly identify where an empty space may be located because of the lack of visibility, either overhead or down the aisles.

Figure 4A:
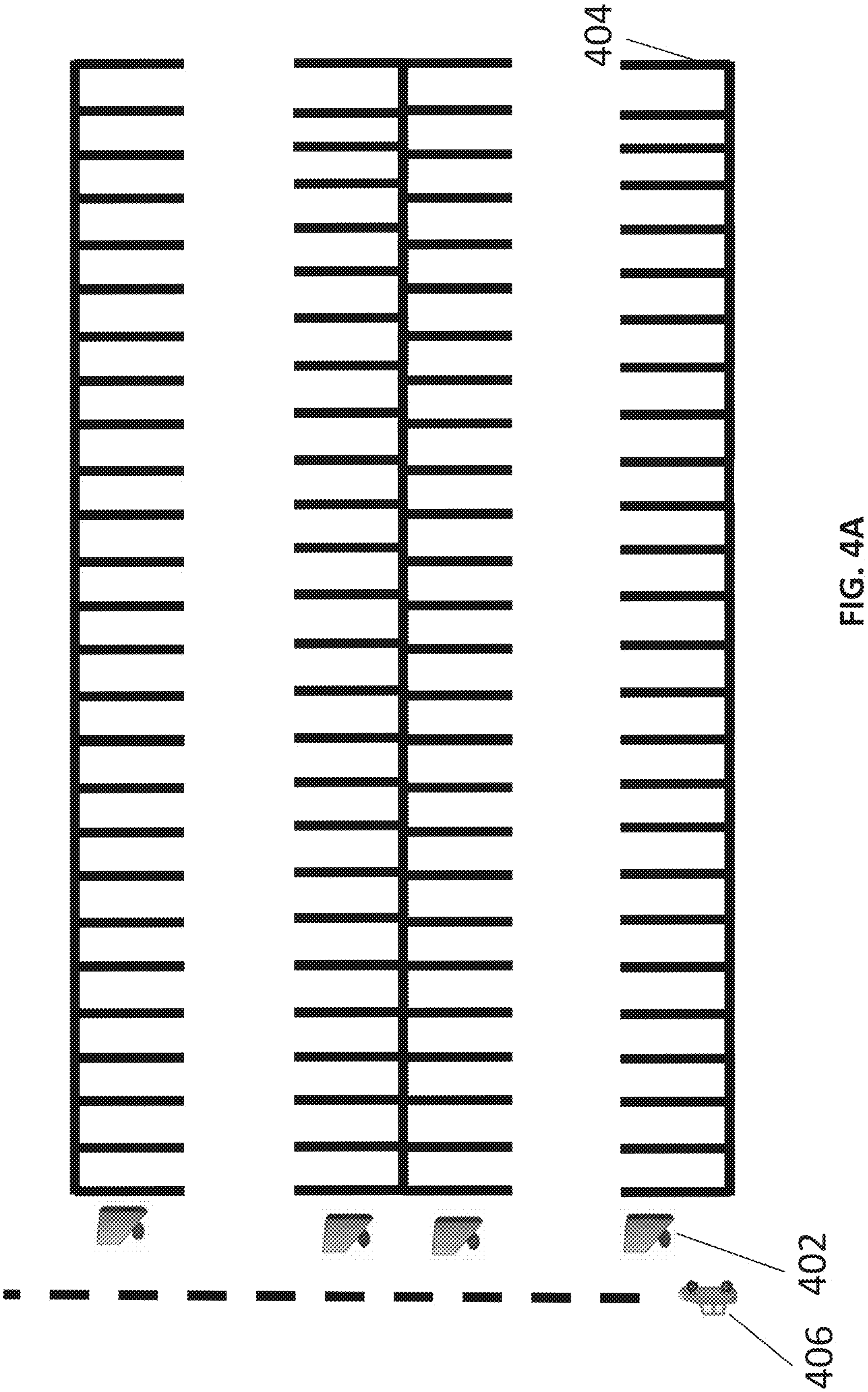
FIG. 4A illustrates a parking space management system in accordance with the subject matter disclosed herein.

Alternatively, instead of having to drive by all the spaces 302 looking for an open space, a parking management system may be used to illustrate the occupancy information of each row of parking spaces. For example, referring now to FIG. 4A, a display 402 may be position at one end of each row of spaces 404, the display 402 being configured to illustrate the occupancy of the parking spaces on that row 404. In this configuration, a driver 406 does not have to drive by each space in a row by row fashion, but instead can simply drive by all the displays 402 and look for available parking spaces as illustrated on the display 402, thereby saving time and energy. It is particularly advantageous for the display 402 to be a bistable electrophoretic reflective display, such as sold commercially by E Ink Corporation. Such a display may comprise an active matrix backplane having pixelated electrodes, or the display may be a simple segmented electrode display capable of showing only a few types of simple symbols.

Figure 4B:
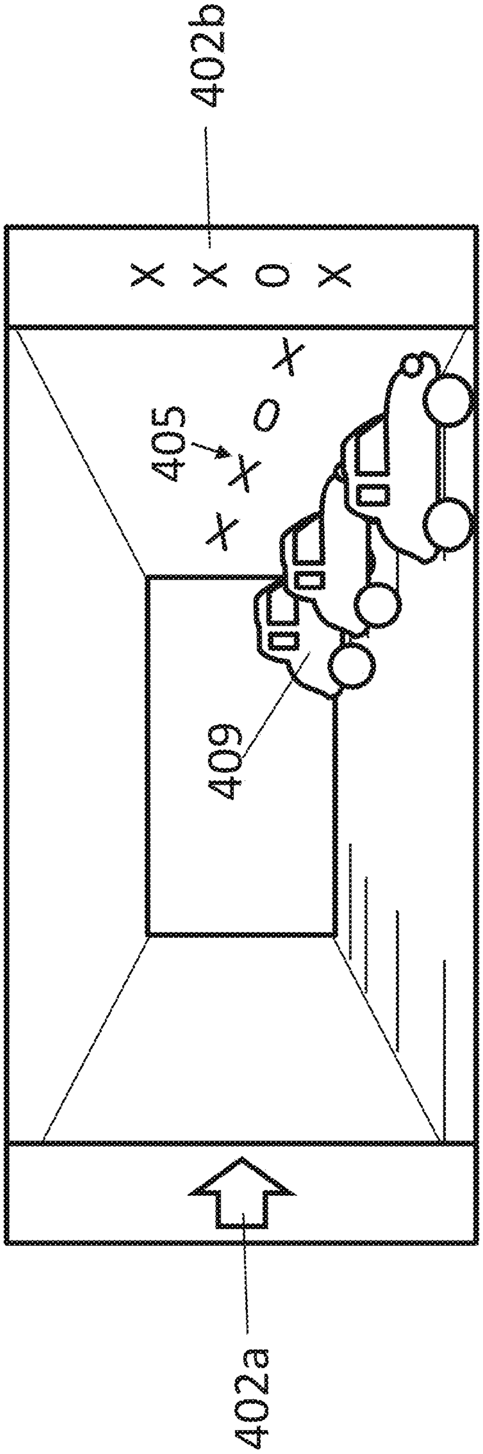
FIG. 4B illustrates a parking space management system in accordance with the subject matter disclosed herein.
Figure 4C:
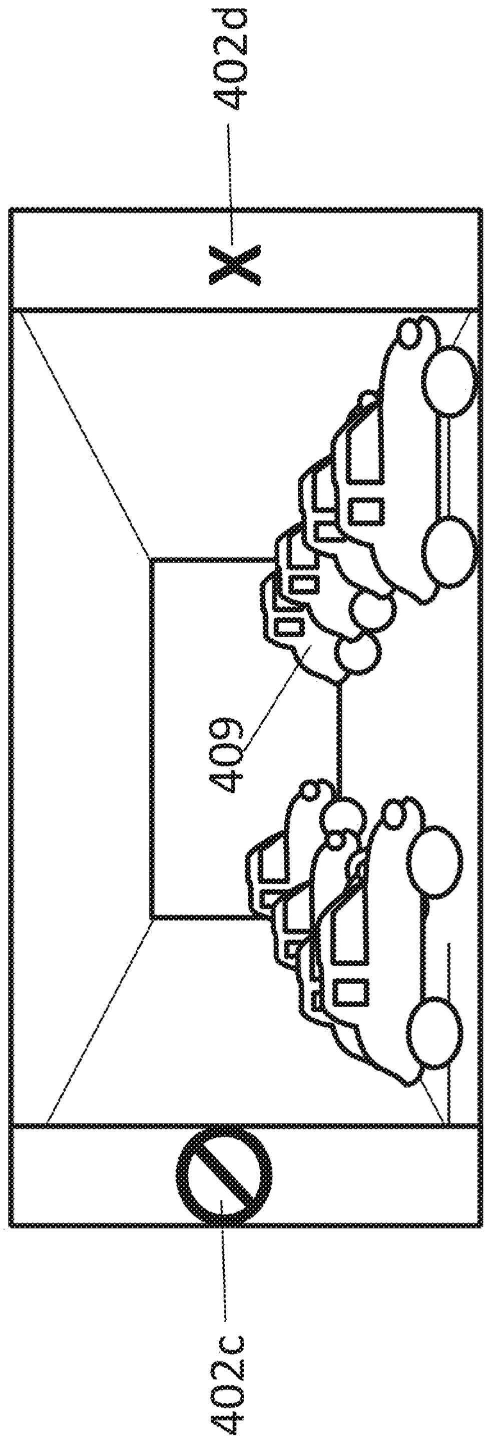
FIG. 4C illustrates a parking space management system in accordance with the subject matter disclosed herein.

Greater details of the display 402 are shown in FIGS. 4B and 4C. The perspective view of FIGS. 4B and 4C is illustrated as if the display 402 is on a cement column of a parking garage at the end of a row of cars, however, it is to be understood that the display 402 could be attached to a different structure, such as a pole, post, pylon, etc. For example, in some embodiments, the display 402 will be deployed adjacent a parking area, such as an open lot outside of a shopping center. The display 402 is preferably a bistable reflective display, such as an electrophoretic display. The display 402 may be wired for power, or the display can have its own power source, such as a battery or a photovoltaic cell or both. Typically, the display 402 will include a controller that will update the image on the display 402 when a suitable signal is received. The display may be flexible so that it can be easily adhered to a curved surface, such as a concrete column, for example with construction adhesive. The display 402 may have wireless communication to receive signals indicating that it is appropriate to change display state. As shown in FIG. 4B, the display 402*a* may be a simple symbol that indicates that parking is available in that aisle or row. In one embodiment, the display 402*a* changes from an easily seen color to the color of the background, i.e., concrete gray. The display may also have a simple and obvious symbol to show that parking is not available, i.e., display 402*d*, indicating that all of the parking spaces in that aisle are full of parked vehicles 409. In some embodiments, the display 402*c* may include multiple colors so that a universally-recognized symbol, such as the circle slash can be displayed, e.g., in red. Other colors for the electrophoretic display include white, black, gray, red, yellow, blue, green, orange, cyan, magenta, brown, and purple.

Figure 5:
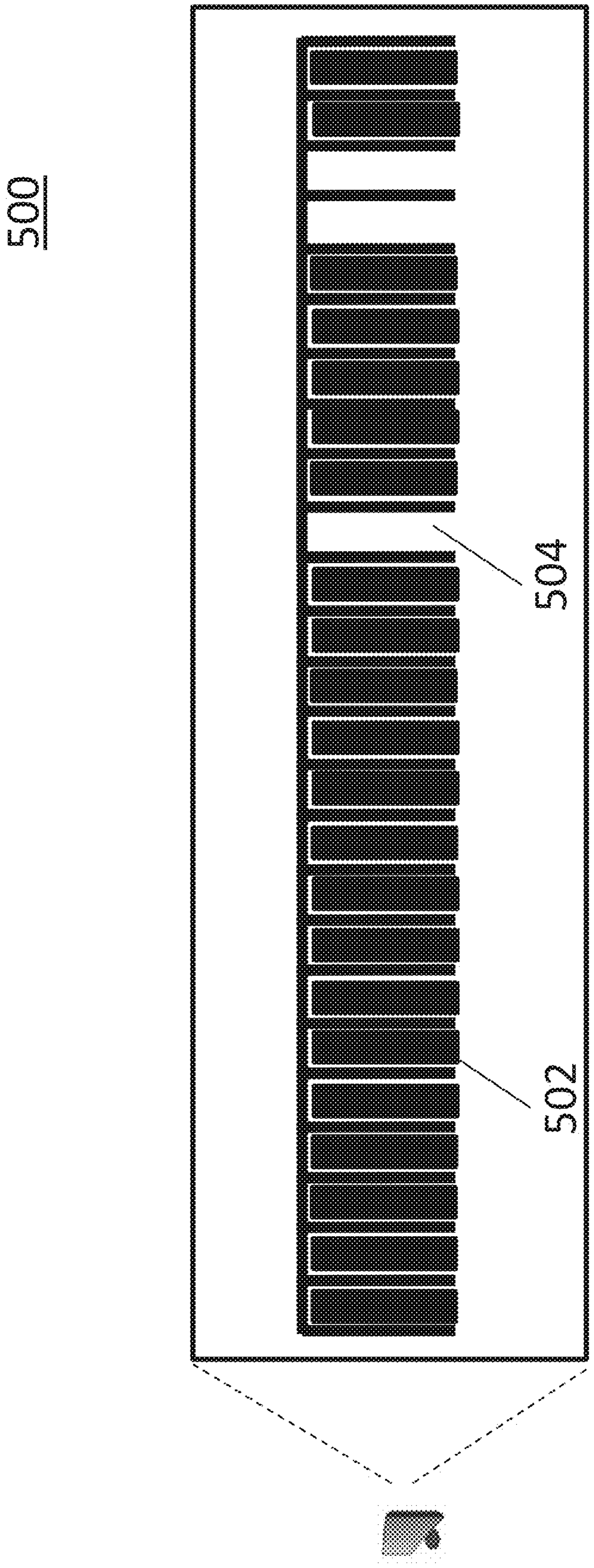
FIG. 5 illustrates an exemplary display for the parking space management system illustrated in FIG. 4.

In other embodiments, the display 402*b* may include alpha-numeric characters which might provide additional information to a drive such as where and how many spaces are available. Such information could be posted at the entrance to a row of cars, or the information may be displayed above the row of cars 405 thereby informing a driver where the vacant parking spaces are located. In another embodiment, a parking management system display 500 may be configured to show empty spaces and occupied spaces, as illustrated in FIG. 5. In this example, occupied spaces such as space 502 may be illustrated with a dark column, representing the space 502 having a car parked in it. Where open spaces such as space 504 may be represented by an empty white space, representing the space 504 having no car parked in it. In this configuration, a driver may drive by all the displays and conveniently find out where the available parking spaces are. It should be appreciated that any other intuitive method may be adopted herein to be shown on the display 500 to let a driver know which spaces are open. Because such a system is displayed on a bistable reflective display, such as an electrophoretic display, the display need only update (and draw energy) when there is a change in the parking availability. In the instance of, for example, a remote parking lot at an airport, this could be many hours or even days. In other words, the physical nature of the electrophoretic displays dictates that this display will require almost no energy while in a standby mode. Energy is only required when displayed information needs to be changed. The display 500 can keep showing the parking space information without the need of a power source, as long as the availability of the spaces does not change.

Figure 6:
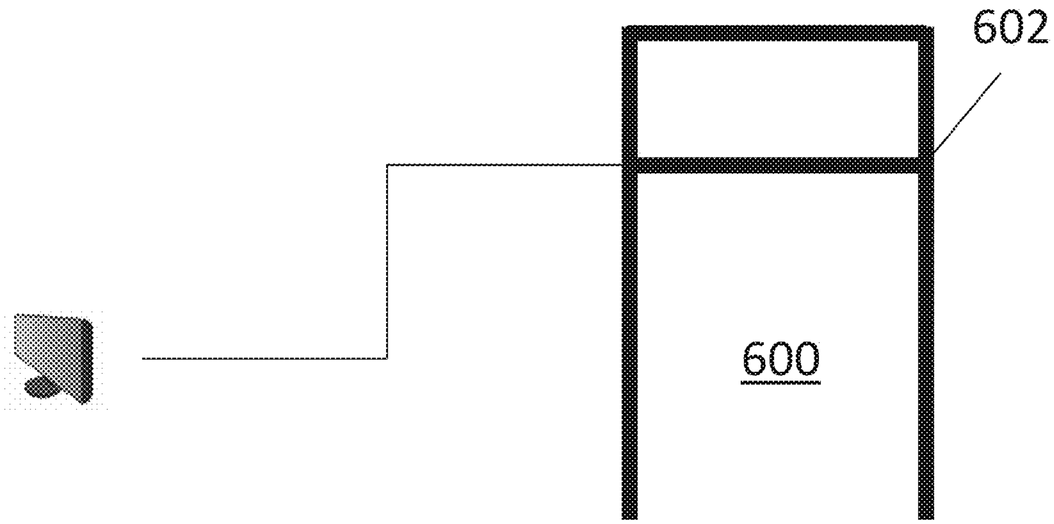
FIG. 6 illustrates a connection between a parking space and the display illustrated in FIG. 5.
Figure 7:
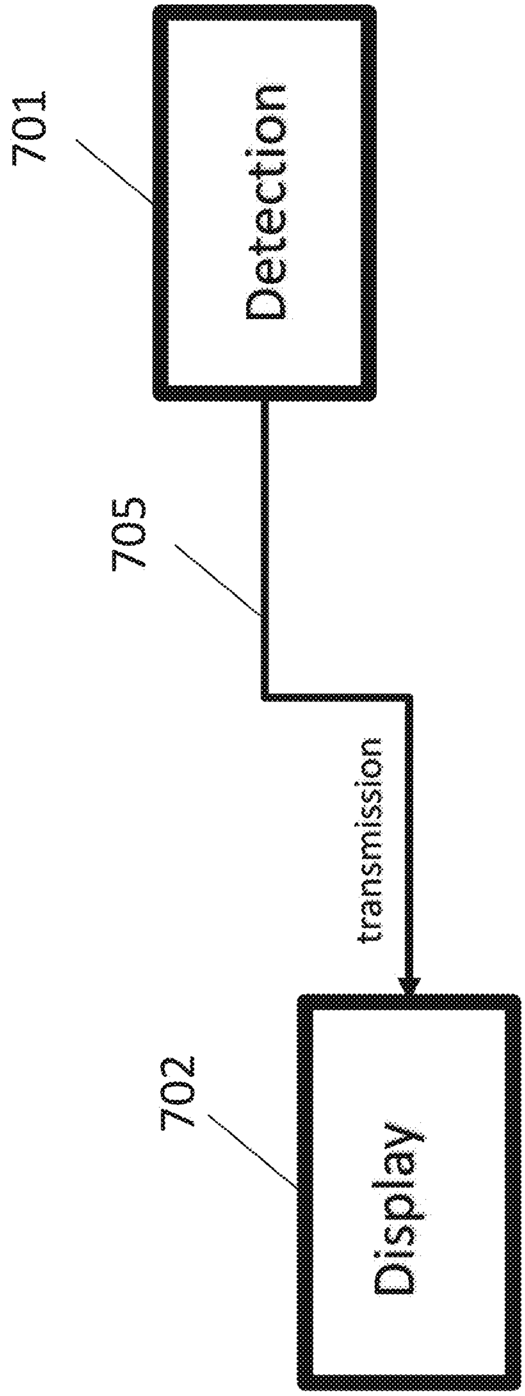
FIG. 7 illustrates a flow chart showing the parking space management system.

Furthermore, referring now to FIG. 6, each parking space 600 (i.e., a bounded space) may be equipped with a triggering mechanism 602, (a.k.a., detector). The bounded space may be physically determined, i.e., with lines painted on the ground or the bounded space may be determined electronically, i.e., by a bounding box on a pixelated image, such as produced by a digital camera. The triggering mechanism 602 may be connected to an electrophoretic display such as the display 500 described above and designed to send a signal and/or electrical pulse to the display, or to a transceiver which relays the signal to the display, or to a controller that tells the display to update, or some combination thereof. When an automobile enters an open parking space, the automobile may trigger the mechanism and change the availability information on the display accordingly. For example, when an automobile enters a previously empty space 504, the mechanism 602 may send an electrical pulse to the display 500 to switch the space 504 from an empty white space to having a darkened space, thereby signaling to an observer that this space is now occupied. Similarly, when the automobile leaves the space, the mechanism 602 will again be triggered, sending another signal to the display, updating the display to an empty status. In summary, as illustrated in FIG. 7, this system utilizes a triggering mechanism as a way of detection, to communicate with a display, updating the display in the process, thereby providing a user of the availability of parking spaces in real time. The transmission of the detection signal 705 from the detector 701 to the display 702 may be accomplished with a signal wire or wirelessly, i.e., using BLUETOOTH or WIFI.

In some embodiments, the triggering mechanism 602 may include a piezo-electric material. When pressed, this piezo-electric material may be configured to generate sufficient charge to produce an electrical signal that is sensed or sent to the electrophoretic display. In some instances, the resulting electrical signal is amplified and transmitted to a receiver or directly to the display, e.g., 702, whereby this electrical signal may provide enough energy to cause the display to update its screen. In other embodiments, the resulting electrical signal will be received and converted to a digital signal and broadcast wirelessly to a receiver in electrical communication with the display or a controller (or other processor) coupled to the display. The triggering mechanism 602 may alternatively include a photodetector and a light source on opposite sides of the parking space 600, or a pneumatic sensor coupled to a hose that spans the parking space 600, or the triggering mechanism 602 can include an infrared proximity sensor, an ultrasonic sensor, or a sensor incorporating an inductive coil that senses a change in the local magnetic field due to the presence of a vehicle. In advanced embodiments a video camera can be used with an algorithm that, for example, "sees" whether a boxed area within the field of view is occupied by some object, presumably a vehicle.

In some other embodiments, the electrophoretic displays used herein may use a backplane that is specifically designed for the application of displaying parking spaces. Meaning, no TFT back planes are necessary, but with a back plane having shaped electrodes that are tailored to the shapes of parking spaces, thereby reduce the cost associated with manufacturing these displays. Additionally, a parking space management system may operate independently of a power source. As the displays will not require any energy in their stand by displaying mode, and will only update when the triggering mechanism generates an electric signal as automobiles enters and occupies, or leaves the space.

Figure 8:
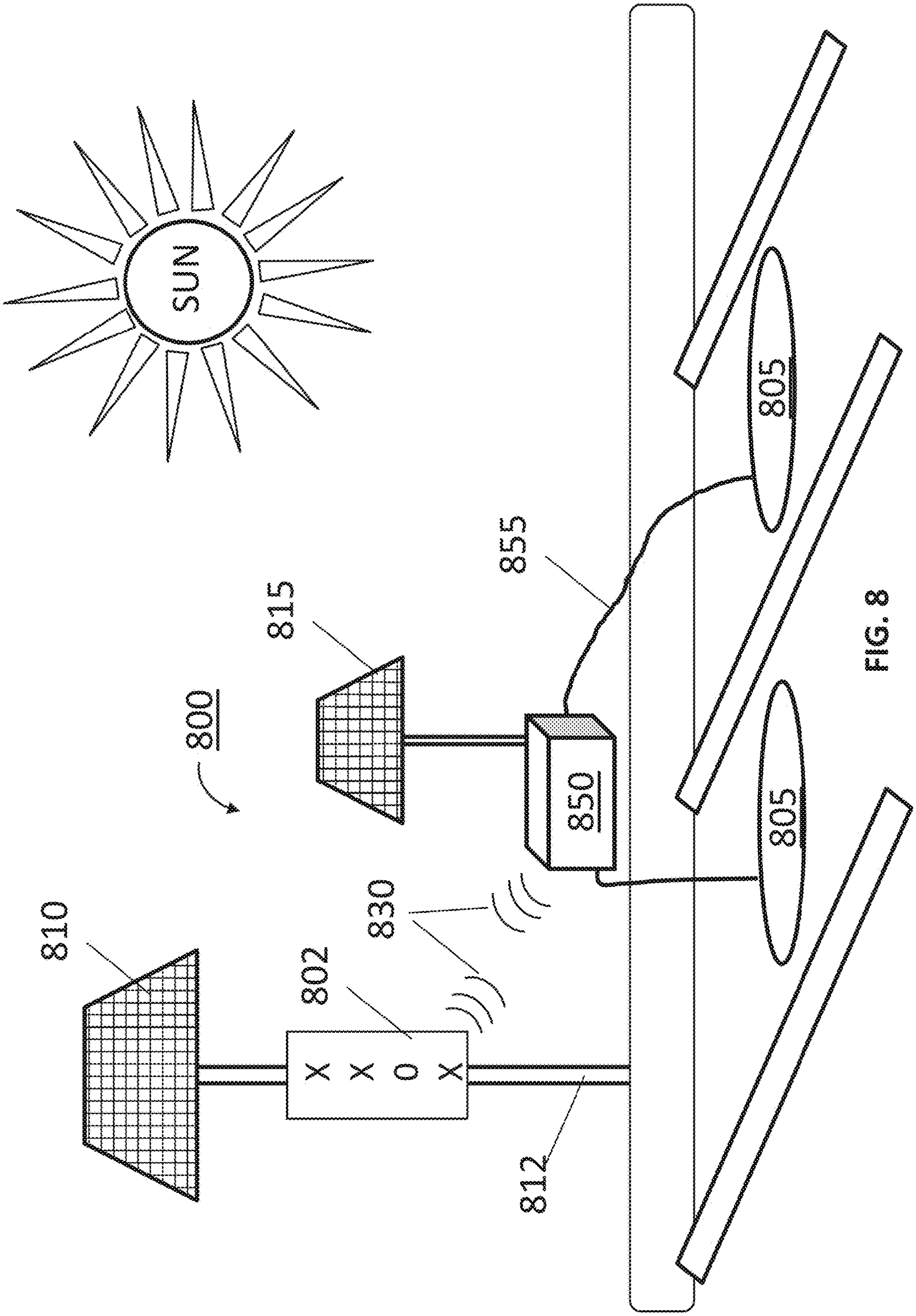
FIG. 8 illustrates an embodiment of a parking space management system powered with photovoltaic cells.
Figure 9:
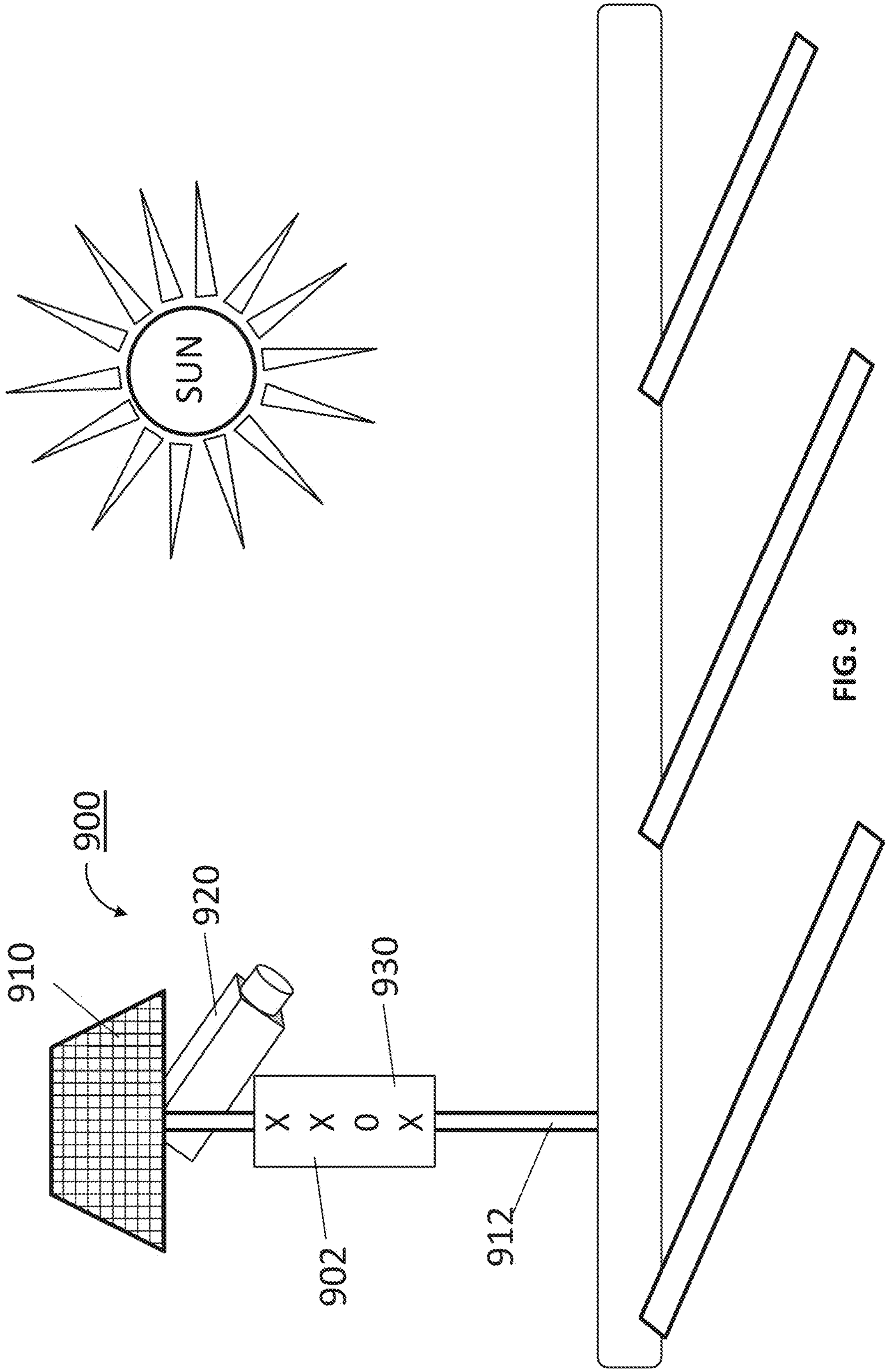
FIG. 9 illustrates an embodiment of a parking space management system powered with a photovoltaic cell and incorporating a camera to determine whether a parking space is occupied.

A parking management system 800 may be temporary or configured for easy roll-out with minimal utilities. As shown in FIG. 8, a parking managements system 800, including a bistable reflective display 802, may be powered exclusively with photovoltaic panels 810, 815. In an embodiment, the parking management system will include a bistable reflective display 802, affixed to a pole 812 that also supports a photovoltaic panel 810 which provides power to the bistable reflective display 802 as well as necessary electronics for driving the bistable reflective display 802 and communications 830, which may be wired or wireless. The communications 830 allow the bistable reflective display 802 to receive information from one or more detectors 805 regarding the availability of a given parking spot, thereby allowing the bistable reflective display 802 to display the status of those parking spots to an observer. As shown in FIG. 8, one or more detectors 805 may be arranged in a hub and spoke model, where individual detectors relay their status (car/no car) to a detection hub 850 which may be a simple circuit designed to collect the status of the various detectors 805 and relay it to the controller of the bistable reflective display 802, or the bistable reflective display 802 directly, to cause the status displayed on the bistable reflective display 802 to be updated. In some embodiments, the detection hub will communicate wirelessly 830 to the bistable reflective display 802. The detection hub 850 may have an independent power supply such as a separate photovoltaic collector 815.

In a temporary parking management system 800, such as may be used for an outdoor event such as a golf tournament or music festival, the various posts 812 may be simple steel posts that are driven into the ground thereby allowing fast deployment. Multiple detection hubs 850 can be arranged with independent power to collect information about the detectors 805 and communicate the information to the bistable reflective display 802. The detectors may be, for example constructed from photodetectors with light sources opposite the photodetectors, or a pneumatic sensor coupled to a hose that spans the parking space, or an infrared proximity sensors, ultrasonic sensors, or including an inductive coil that senses a change in the local magnetic field due to the presence of a vehicle.

An advanced embodiment of a deployable parking management system 900 may require only a few poles 912, each with a bistable reflective display 902 and a camera 920 that is programmed to signal to the bistable reflective display 902 when a parking space has become occupied. Because of the great reduction in cost and complexity of digital cameras, it is possible that the camera 920 can be integrated into the same housing 930 as the bistable reflective display 902, meaning that an observer would not immediately recognize that the parking area was being monitored by a camera. It may be possible to program the camera 920 after installation using an app coupled to a smart phone.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense. It is also to be appreciated that a similar system can be used to rely information about available inventory, i.e., in a warehouse, or availability for storage of, for example, shipping containers in a yard. Because such use cases typically involve long periods of no status update, a reflective bistable display results in substantial energy savings and allows quick deployment using, e.g., photovoltaics and/or batteries for power.

The invention claimed is:

1. A temporary parking space management system comprising:

an electrophoretic display;

a plurality of detectors configured to determine the presence of objects within bounded spaces;

a detection hub coupled to the plurality of detectors and configured to receive signals from the detectors and to relay the signals to the electrophoretic display; and a plurality of photovoltaic panels, wherein a first photovoltaic panel is operatively coupled to the electrophoretic display and configured to power the electrophoretic display, and a second photovoltaic panel is operatively coupled to the detection hub and the plurality of detectors and configured to power the detection hub and detectors, wherein the detection hub is configured to communicate with the electrophoretic display and cause the electrophoretic bistable reflective display to show the presence of an object within one of the bounded spaces to an observer.

2. The parking space management system of claim 1, wherein the electrophoretic display comprises an active matrix backplane.

3. The parking space management system of claim 1, wherein the electrophoretic display comprises a plurality of segmented electrodes.

4. The parking space management system of claim 1, wherein the electrophoretic display is flexible.

5. The parking space management system of claim 1, wherein each detector is a camera, an infrared sensor, an ultrasonic sensor, a piezoelectric sensor, or uses an inductive coil to determine the presence of a metallic object.

6. The parking space management system of claim 1, wherein the bounded space is a parking spot in a parking lot and the object is a vehicle.

7. The parking space management system of claim 1, wherein the detector hub communicates with the electrophoretic display wirelessly.

* * * * *